United States Patent [19]

Hackenberg et al.

[11] Patent Number: 5,003,343
[45] Date of Patent: Mar. 26, 1991

[54] PROJECTION COPYING APPARATUS AND PROJECTION SCREEN THEREFOR

[75] Inventors: Hubert Hackenberg, Holzkirchen; Traugott Liermann, Unterhaching; Franz Nadler, Dietersheim; Herbert Plaschke, Gernlinden; Hans J. Schrecke, Grasbrunn, all of Fed. Rep. of Germany

[73] Assignee: AGFA-Gevaert AG, Leverkusen, Fed. Rep. of Germany

[21] Appl. No.: 473,615

[22] Filed: Feb. 1, 1990

[30] Foreign Application Priority Data

Feb. 2, 1989 [DE] Fed. Rep. of Germany ....... 3903101

[51] Int. Cl.5 .................... G03B 13/24; G03B 13/26
[52] U.S. Cl. ......................... 355/44; 355/40; 355/218
[58] Field of Search .............. 340/784; 350/330; 355/20, 40, 44, 218

[56] References Cited

U.S. PATENT DOCUMENTS

| | | | |
|---|---|---|---|
| 4,472,050 | 9/1984 | Stockburger et al. | 355/40 |
| 4,734,789 | 3/1988 | Smith et al. | 355/40 X |
| 4,903,078 | 2/1990 | Yeo | 355/218 |
| 4,929,057 | 5/1990 | Aoki et al. | 355/40 X |
| 4,933,754 | 6/1990 | Reed et al. | 355/40 X |

Primary Examiner—Richard A. Wintercorn
Attorney, Agent, or Firm—Michael J. Striker

[57] ABSTRACT

A projection copying apparatus for reproducing microfilmed originals on a light-tightly disposable projection screen and for producing copies of microfilmed originals comprises means for copying of dot originals operating for complete or sectional copying of the originals, and a projection screen including a diffusing disc, an LCD dics arranged on the diffusing disc, the LCD disc being switchable between two conditions so that in one of the conditions it is transparent for observation of the originals and in the other of the conditions it is opaque for copying or searching.

18 Claims, 3 Drawing Sheets

PROJECTION COPYING APPARATUS AND PROJECTION SCREEN THEREFOR

BACKGROUND OF THE INVENTION

The present invention relates to a projection copying apparatus for reproducing microfilmed originals on a light-tightly coverable projection screen, and also for producing More particularly, it relates to such a projection copying apparatus which is used for the above specified purposes and in which the original is copied completely or partially by means of an arrangement suitable for copying of dotted originals.

The German document DE-OS 3,309,578 described a projection copying apparatus in which the penetration of exterior light through the projection screen during the copying process is prevented by means of a shade which covers the projection screen in a light-tight manner. Indication and selection of portions to be copied from the enlargement of the microfilmed originals are performed in this apparatus by electromechanical elements, for example by two potentiometers with axes each coupled with a pointer.

The utilization of mechanical or electromechanical structural elements has the disadvantage that the frequency of maintenance which depends on the wear of the structural parts is relatively high. In addition, due to the mechanical inertia of the shade during its pulling, the time of the copying cycle is increased.

SUMMARY OF THE INVENTION

Accordingly, it is an object of the present invention to provide a projection screen for projection copying apparatus which is formed so that a fast and wearfree switching is performed between one condition preventing the penetration of exterior light, and another condition permitting the projection of microfilmed originals.

In keeping with these objects and with others which will become apparent hereinafter, one feature of the present invention resides, briefly stated, in a projection screen which has a diffusing disc and an LCD disc arranged on said diffusing disc and switchable between a transparent condition for observation of the original and an opaque condition for a copying and/or searching process.

When the projection screen is designed in accordance with the present invention it avoids the disadvantages of the prior art and achieves the above-specified objects.

Another feature of the present invention is a projection copying apparatus in which the projection screen in accordance with the present invention is used, with the accompanying advantages.

The present invention provides for a special advantage in that the LCD-disc performs displaying of freely programmable symbols on the projection screen.

Another feature of the present invention is that the projection screen has a projection surface, an edge surface provided with a luminous foil, and a terminal surface illuminated by a light source.

It is another feature of the present invention that on the edge surface and on the terminal surface the data are indicated, which serve for guidance of an operator, for indication of an image portion to be copied and for displaying of a film-specific information.

Still another feature of the present invention is that the symbols which must be written on a copy of the original in addition to the microfilmed original are displayed inside the projection surface.

A further feature of the present invention is that the portions of the edge surface which are not used for displaying of the above mentioned data, are switchable between the opaque and transparent conditions inversely to the projection surface.

Still a further feature of the present invention is that a freely configuratable foil keyboard is integrated in the terminal surface behind the latter as considered in the observation direction.

The limiting edges between the projection surface and the edge surface can be used for marking a "begin of scan" and "end of scan" for the arrangement for copying the originals.

The LCD disc in the region of the projection surface can switchable between the opaque and transparent condition and vice versa in a segment or pixel-like manner, and the surrounding area of the freely selectable image portion can be switchable to the opaque condition, while the image portion can be switchable to the transparent condition.

Information contained in signals for controlling the LCD disc can be used through the image portion to be copied during the portion-like copying, for controlling the arrangement for copying the originals.

Finally, the image portion to be copied can be indicated by means of a plurality of indicating elements arranged on the edge surface, in X-direction and in Y-direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
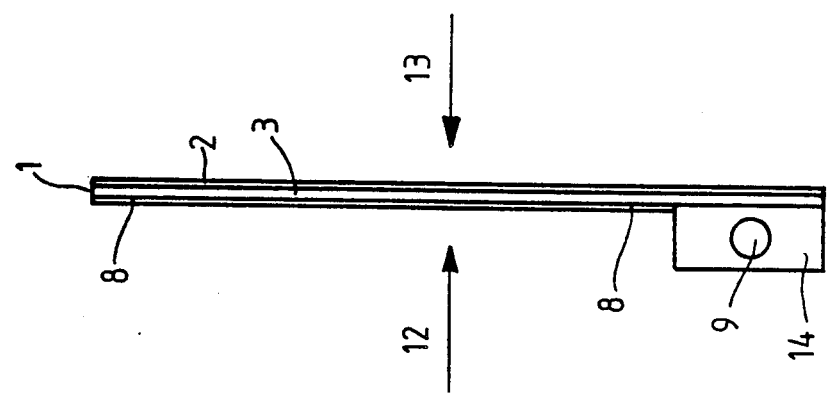
FIG. 2 is a side view of the projection screen in accordance with the present invention.
Figure 1:
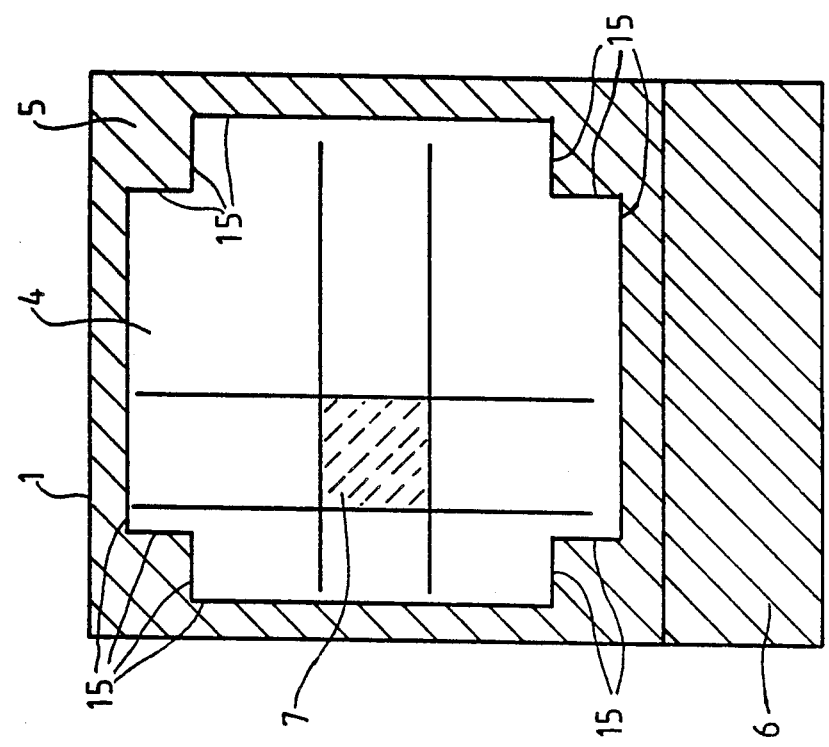
FIG. 1 is a front view of a projection screen in accordance with the present invention.

FIG. 1 shows a projection screen in accordance with the present invention for a projection copying apparatus. The projection screen is identified as a whole with reference numeral 1 and has a projection surface 4 lying inside of limiting edges 15, an edge surface 5, and a terminal surface 6. FIG. 2 shows a cross-section of the projection screen 1 of FIG. 1. The projection screen includes a diffusing disc identified with reference numeral 2, an LCD disc arranged before the diffusing disc 2 as considered in a projection direction 12 and identified with reference numeral 3, and a luminous foil identified with reference numeral 8.

The control of the projection copying apparatus is performed by a freely configuratable foil keyboard 14 shown in FIG. 2. It is arranged in the observation direction 13 behind the terminal surface 6 illuminated by means of a light source 9.

An image portion to be copied is identified in FIGS. 1 and 2 with reference numeral 7. It is freely adjustable by an operator. By means of indicating elements which are arranged on the edge surface 5, the image portion 7 is displayed. They are identified in FIG. 3 with reference numeral 11 in X-direction and with reference numeral 10 in Y-direction.

The indication of the image portion 7 can be performed however directly by means of the LCD disc 3. For this purpose it is formed controllable in the region of edge surface 5 in a pixel or segment-like manner.

If the LCD disc 3 is controllable in a pixel or segment-like manner not only in the region of the edge surface 5, but also in the region of the projection surface 4, the part of the projection surface 4 which surrounds the image portion 7 can be switched to opaque, while the image portion 7 can be left transparent. Thereby a further possibility is provided for indicating the image portion 7.

The operation of the projection screen in connection with an inventive projection copying apparatus will be explained hereinbelow. In a projecting copying apparatus microfilmed originals are projected by means of a projection apparatus on a diffusing disc 2. The diffusing disc 2 has such optical properties that an image of the projected original is produced in a form readable by users.

When it is necessary to copy a predetermined original, the projected image of the original is sent and printed on paper by a printer. During the sensing process, the external light which can penetrate through the projection surface 4 in the projection device has a disturbing influence. Furthermore, the observation of the passing images during positioning on the image address of the next microfilmed original to be projected and/or copied is tiring for the operator.

When the LCD disc 3 during the copying process and positioning process or searching process is switched to opaque, then during copying the penetration of external light is totally eliminated and during searching the production of passing images on the diffusing disc 2 is prevented. During the copying process the signals required for its control are produced from the projection screen 1 itself or from its control signals. The signals "begin of scan" and "end of scan" which signal the beginning and the end of the projection surface 4 are generated from the changing degree of reflection of the projection screen rear side at the limiting lines 15.

From the control signals for the projection screen 1 or the LCD disc 3, signals can be derived for controlling the copying arrangement with respect to the image portion 7.

The signals corresponding to the image portion 7 to be copied can be also given directly from a central control unit to the copier arrangement. The image portion 7 defined by them is indicated in the above described manner on the projection screen 1.

After the copying and/or positioning, the LCD disc 3 is switched to transparent, and the image of the microfilmed original whose image address is directly adjusted can be observed.

In addition to the basic function of opaque switching and transparent switching, symbols are displayed which during a copying process are printed on the copy of the original. The symbols can serve for association of the copy with an order. In addition, symbols or other information can be displayed outside the projection surface 4 on the edge surface 5 and/or terminal surface 6 illuminated by a light source 9. These symbols or informations guide the operator and/or give him explanations of film-specific data, for example image address, blip, etc.

The switching of the edge surface 5, inversely to the change of the projection surface 4, from opaque to transparent and vice versa before and after a copying process for protecting the eyes of the operator is a further function, which increases the operational comfort of the projection copying apparatus.

Finally, due to the integration of a foil keyboard 14 into illuminatable terminal field 6, a combination of all elements required for operating the projecting copying apparatus is provided in a manner favorable for the operator and readily observable by him. Thereby an optimal operation is possible.

Figure 3:
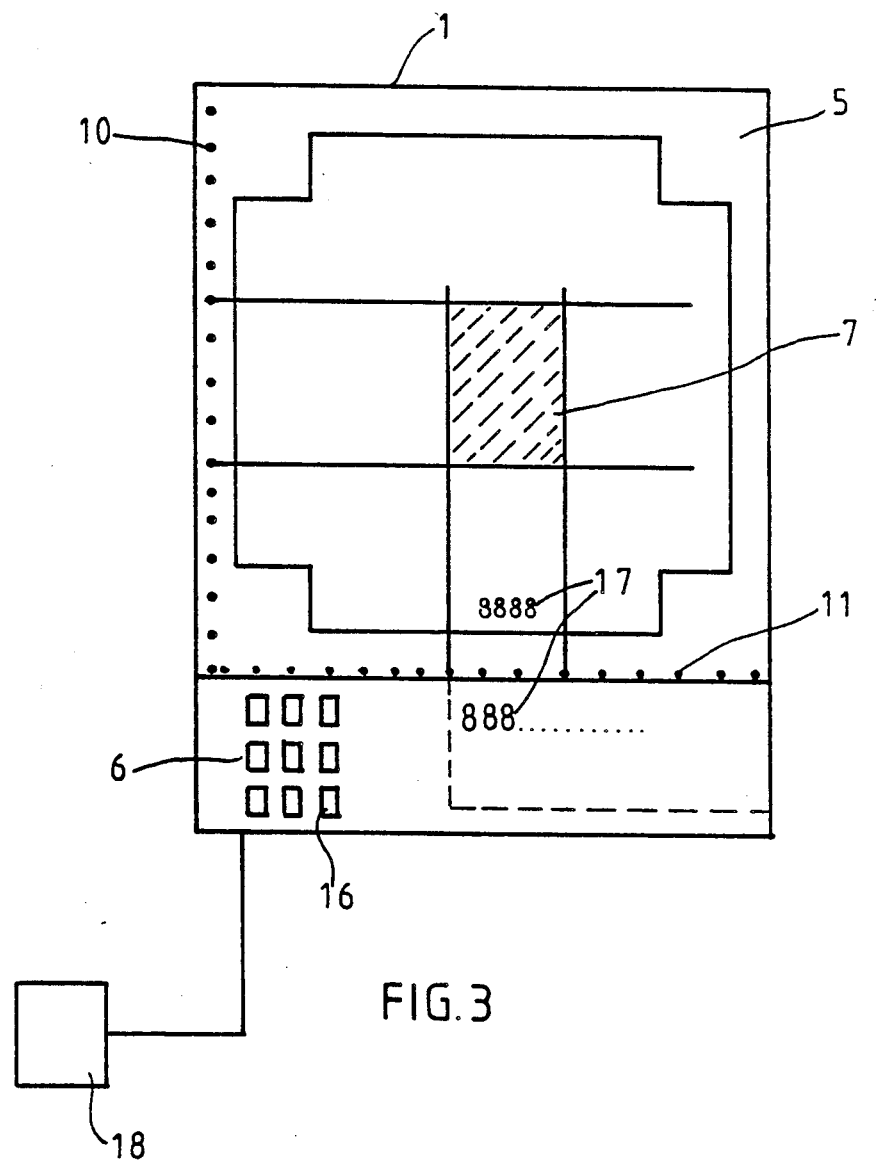
FIG. 3 is a front view of a projection screen in accordance with another embodiment, with shown indicating elements.
Figure 4:
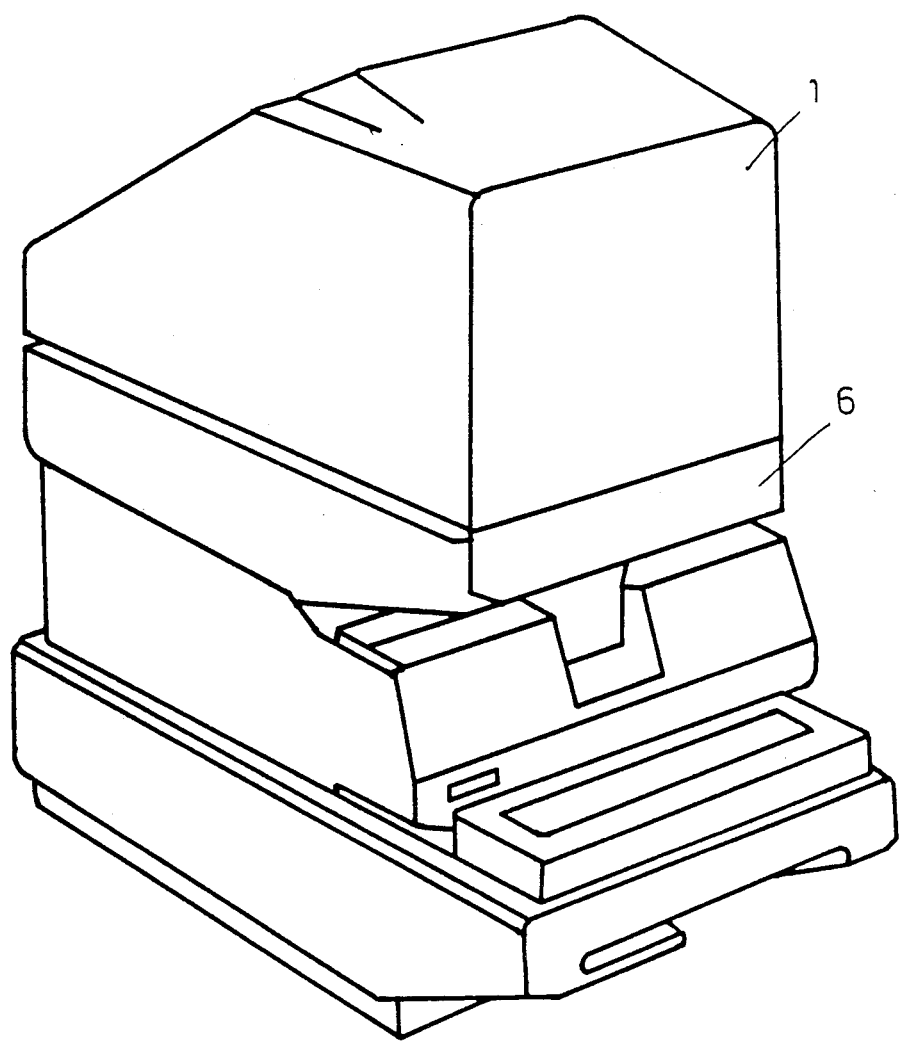
FIG. 4 is a perspective view showing a copying apparatus with the projection screen of the invention.

Reference numeral 16 identifies in FIG. 3 a freely configuratable keyboard, reference numeral 17 identifies means for switching symbols within projection surface and terminal surface, and reference numeral 18 identifies switching means for LCD screen.

Some further explanations are believed to be advisable. It should be emphasized that the switching of the LCD screen is achieved by applying a voltage to a permeable electrode in the proximity of the liquid crystals. In response to the voltage applied, the liquid crystals, which are placed between two equally oriented polarization filters, will turn the polarization plane of a penetrating light beam. Thus, a difference between the orientation of the polarization filter and the polarization plane of the light beam penetrating the liquid crystal is created. Hence, the light beam cannot penetrate the second polarization filter and the LCD screen will be in the opaque condition.

The light permeable electrodes can be shaped and assembled so as to achieve the desired effects of the present invention, or in other words, to switch the LCD screen between two conditions, so that in one of the conditions it is transparent for observation of the originals and in the other of the conditions it is opaque for copying or searching. The control of the electrodes can be effected by any micro-controlled with the appropriate interface circuitry. Therefore, neither the electrodes nor the micro-controller nor any other part of the projection copying apparatus are described or shown.

It will be understood that each of the elements described above, or two or more together, may also find a useful application in other types of constructions differing from the types described above.

While the invention has been illustrated and described as embodied in a projection copying apparatus for reproducing of microfilmed originals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A projection copying apparatus for reproducing microfilmed originals on a light-tightly disposable projection screen and for producing copies of microfilmed originals, comprising means for copying of dot originals operating for complete or sectional copying of the originals; and a projection screen including a diffusing disc, an LCD disc arranged on said diffusing disc, said LCD disc being switchable between two conditions so that in one of said conditions it is transparent for observation of the originals and in the other of said conditions it is opaque for copying or searching.

2. A projection copying apparatus as defined in claim 1, wherein said projection screen has a projection surface, a luminous edge surface, and illuminatable terminal surface.

3. A projections copying apparatus as defined in claim 2, wherein said edge surface is provided with a luminous foil; and further comprising a light source illuminating said terminal surface.

4. A projections copying apparatus as defined in claim 2, wherein said edge surface and said terminal surface are formed so that data can be indicated on said edge surface and said terminal surface for guiding an operator, for identifying an image portion to be copied and for displaying film-specific information.

5. A projection copying apparatus as defined in claim 4; and further comprising means for indicating on said edge surface and said terminal surface the data for guiding an operator, for identifying an image portion to be copied and for displaying film-specific information.

6. A projection copying apparatus as defined in claim 2, wherein said projection surface is formed so that symbols which must be written in addition to a microfilmed original on a copy of the original are shown within said projection surface.

7. A projection copying apparatus as defined in claim 6; and further comprising means for showing within said projection surface of symbols which must be written in addition to the microfilmed original on a copy of the original.

8. A projection copying apparatus as defined in claim 4, wherein said projection surface is switchable between said transparent condition and said opaque condition, said edge surface having a portion which is not used for displaying said data and which is switchable between an opaque condition and a transparent condition inversely to said projection surface.

9. A projection copying apparatus as defined in claim 8; and further comprising means for switching said part of said edge surface between said opaque condition and said transparent condition inversely to said projection surface.

10. A projection cpying apparatus as defined in claim 2; and further comprising a freely configuratable foil keyboard integrated in said terminal surface and arranged behind the latter as considered in an observation direction.

11. A projection copying apparatus as defined in claim 2; and further comprising limiting edges arranged between said projection surface and said edge surface and serving for marking a "begin of scan" and "end of scan " for copying the originals.

12. A projection copying apparatus as defined in claim 2, wherein said LCD disc in the region of said projection surface is switchable between an opaque condition and a transparent condition, said projection screen having a freely selectable image portion, a surrounding area of said freely selectable image portion being switchable to an opaque condition and said image portion being switchable to a transparent condition and vice versa.

13. A projection copying apparatus as defined in claim 12; and further comprising means for switching said surrounding area to said opaque condition and for switching said image portion to said transparent condition.

14. A projection copying apparatus as defined in claim 12, wherein said LCD disc in said region of said projection surface is switchable from said opaque condition to said transparent condition and vice versa in a segmentlike manner.

15. A projection copying apparatus as defined in claim 12, wherein said LCD disc in said region of said projection surface is switchable from said opaque condition to said transparent condition and vice versa in a pixel-like manner.

16. A projection copying apparatus as defined in claim 12; and further comprising means for producing signals for controlling said LCD disc, and means for using an information contained in said signals through said image portion to be copied during copying in portions, for controlling said means for copying the originals.

17. A projection copying apparatus as defined in claim 2; and further comprising a plurality of indicating elements arranged on said edge surface and indicating an image portion to be copied in X-direction and in Y-direction.

18. A projection screen for a copying apparatus for reproducing microfilmed originals and producing copies of microfilmed originals, comprising a diffusing disc, an LCD disc arranged on said diffusing disc, said LCD disc being switchable between two conditions so that in one of said conditions it is transparent for observation of the originals and in the other of said conditions it is opaque for copying or searching.

* * * * *